United States Patent
Linde et al.

(10) Patent No.: US 7,984,669 B2
(45) Date of Patent: Jul. 26, 2011

(54) AUXILIARY FORCE STEERING DEVICE FOR A VEHICLE

(75) Inventors: Joachim Linde, Waldstetten (DE); Michael Haegele, Aalen (DE)

(73) Assignee: ZF Lenksysteme GmbH, Schwaebisch Gmuend (DE)

(*) Notice: Subject to any disclaimer, the term of this patent is extended or adjusted under 35 U.S.C. 154(b) by 136 days.

(21) Appl. No.: 12/589,671

(22) Filed: Oct. 27, 2009

(65) Prior Publication Data

US 2010/0116125 A1  May 13, 2010

Related U.S. Application Data

(63) Continuation of application No. PCT/EP2008/054986, filed on Apr. 24, 2008.

(30) Foreign Application Priority Data

Apr. 27, 2007 (DE) .......................... 10 2007 019 906

(51) Int. Cl.
*B62D 5/12* (2006.01)
*B62D 5/22* (2006.01)
(52) U.S. Cl. .................. 91/399; 91/402; 91/404; 91/409
(58) Field of Classification Search ................. 91/375 A, 91/399, 400, 401, 402, 403, 404, 409
See application file for complete search history.

(56) References Cited

U.S. PATENT DOCUMENTS 6,161,465 A * 12/2000 Hafermalz ...................... 91/401
6,318,232 B1   11/2001 Lemke et al.

FOREIGN PATENT DOCUMENTS

| DE | 4435848 A1 * | 4/1996 |
| EP | 0 937 206 | 8/1999 |
| EP | 1 052 159 | 11/2000 |
| JP | 8-183469 | 7/1996 |

* cited by examiner

Primary Examiner — Thomas E Lazo
(74) Attorney, Agent, or Firm — Jordan and Hamburg LLP

(57) ABSTRACT

A power steering device for a vehicle which is disposed in the transmission path between a steering handle and a steerable vehicle wheel, comprises a servo cylinder having two pressure chambers, which are separated by a working piston and are each connected to a pressure supply unit. A valve plunger, which seals a bypass channel between the pressure chambers, is movably disposed on the working piston. Furthermore, an adjustment bushing comprising an adjustment section is disposed in the servo cylinder, the valve plunger being moved against this section upon approaching an axial limit position, thereby opening the bypass channel. The adjustment bushing is clamped into the servo cylinder, yet held displaceably, wherein, on the adjustment bushing, a sealing section is provided, which is to be moved into a sealing position with the working piston so as to interrupt the flow connection between the pressure chambers.

17 Claims, 3 Drawing Sheets

AUXILIARY FORCE STEERING DEVICE FOR A VEHICLE

BACKGROUND OF THE INVENTION

The invention relates to a power steering device for a vehicle.

Such a power steering device, which is employed as a servo steering assistance system in motor vehicles, is described in EP 0 397 206 B1. The power steering device comprises a servo cylinder having two pressure chambers, which are separated by a working piston and supplied with hydraulic fluid by a pressure supply unit. Depending on the desired working movement of the piston, either one or the other pressure chamber in the servo cylinder is subjected to pressurized hydraulic fluid.

In order to prevent hard impact of the working piston against the limit stops in the servo cylinder in the region of maximum travel, the power steering device is equipped with a pressure relief unit, which opens a bypass between the two pressure chambers as the working piston reaches the axial end position, whereupon pressure equalization takes place between the pressure chambers so that further travel of the working piston in the direction of the limit stop is blocked. The pressure relief unit comprises a valve plunger, which is held movably on the working piston and during normal operation seals the bypass between the pressure chambers.

Upon approaching the limit stop, the movable valve plunger moves against an adjustment bushing fixedly disposed in the servo cylinder and is adjusted by said bushing from the sealing position into an open position, thereby opening the bypass and enabling the transfer of hydraulic fluid between the pressure chambers. This pressure limitation upon reaching the limit stop has the effect that the pump is not forced to work against the pressure control valve and thus counter to the maximum operating pressure, which in addition to noise would also result in strain on the pump due to overheating. The limit stop is additionally protected from mechanical overload and/or deformation. Finally, a drop in the motor speed of the pressure pump is prevented.

SUMMARY OF THE INVENTION

Starting from this state of the art, it is the object of the invention to configure a power steering device by way of simple design means so that it can be used in different vehicles. In particular, it should be possible to adapt the position of the shut-off point, at which pressure equalization takes place between the pressure chambers, with little effort.

The power steering device for a vehicle, and particularly a motor vehicle, according to the invention, is disposed in the transmission path between a steering handle, such as a steering wheel, and at least one steerable vehicle wheel and comprises a servo cylinder having two pressure chambers separated by a working piston, wherein the movement of the working piston caused by the pressurized medium in the pressure chambers is used to assist the steering movement.

The pressure chambers in the servo cylinder on either side of the working piston are each connected to a pressure supply unit and are supplied by the same with pressurized medium, and particularly hydraulic fluid, as necessary.

A valve plunger is movably disposed on the working piston, the valve plunger being able to perform movement relative to the working piston. During normal operation, this valve plunger is in a sealing position, in which the valve plunger seals a bypass or bypass channel by which a bypass between the pressure chambers can be produced. As the axial end position is approached, the valve plunger can be adjusted from the sealing position into an open position, in which the bypass channel is opened and pressure equalization between the pressure chambers is enabled by way of the bypass channel. The movement of the valve plunger between the sealing position and the open position, as the axial end position is approached, is carried out by way of an adjustment bushing in the servo cylinder, the bushing comprising an adjustment section against which the valve plunger is moved as the axial end position is approached. The adjustment section strikes against the valve plunger and adjusts the same from the sealing position into the open position, whereupon the bypass channel is cleared.

According to the invention, it is also provided that, while the adjustment bushing is pressed into the servo cylinder, it is held displaceably in the servo cylinder. The adjustment bushing comprises a sealing section, wherein the working piston is to be brought into a sealing position with the sealing section, and in this sealing position the flow connection between the pressure chambers is interrupted, regardless of the position of the valve plunger. This opens up the possibility of axially positioning the adjustment bushing as needed in the desired position in the servo cylinder, thereby fixing the axial limit stop for the working piston. In this way, the power steering device can be used for different vehicle models without design changes or adaptations. The only necessary feature is an axial adjustment of the adjustment bushing.

The axial adjustment of the adjustment bushing in the servo cylinder is carried out in that the working piston is brought into the sealing position with the sealing section on the adjustment bushing, thereby closing the bypass channel, regardless of the current position of the valve plunger. In order to, for example, position the adjustment bushing in the direction of an axle stop that is further removed axially, first the load is removed from the steerable wheels of the vehicle, for example by lifting the vehicle or by arranging the steerable wheels on rotary tables, so that the counterholding forces at the wheel are substantially reduced to zero. Subsequently, in the unloaded state, the working piston is adjusted so far in the direction of the axle stop by way of a steering angle produced by the driver until the working piston has reached the sealing position with the sealing section of the adjustment bushing. As this position is reached, further transfer via the bypass channel is prevented so that, with a further manual steering angle, the adjustment bushing, which is clamped in the servo cylinder, yet held displaceably, is displaced to the outside by the working piston.

After the desired axial end position of the adjustment bushing has been reached, the vehicle can be lowered again, or removed from the rotary tables; thereafter normal steering operating is possible, during which the working piston cannot assume the sealing position with the sealing section at the adjustment bushing, because during normal operation the adjustment section on the adjustment bushing pressurizes the movable valve plunger before the sealing position has been reached, thereby opening the bypass channel. In this way, it is ensured that during normal operation pressure is reduced in the pressurized pressure chamber, without adjusting the adjustment bushing. Even if, during normal operation, the working piston is adjusted further in the direction of the adjustment bushing, and finally the working piston reaches the sealing position with the sealing section on the adjustment bushing, axial displacement of the adjustment bushing is not possible as a result of the extremely high counterholding forces, which are effective due to the vehicle weight and the typically high friction between the tires and the road.

In order to bring about an adjustment of the adjustment bushing in the opposite direction—which is to say in a position displaced toward the center—(readjustment process), the load is likewise first removed from the steerable wheels and the working position is adjusted in the direction of the axle stop until the working piston has reached the sealing position with the sealing section of the adjustment bushing. Then, the vehicle is lowered or removed from the rotary tables. This is followed by a steering movement in the opposite direction, as a result of which the pressure chamber adjusting the working piston in the desired direction is subjected to the pressure of the medium, then this pressure also acts on the adjustment bushing. Since the working position is in the sealing position with the adjustment bushing, the pressure of the adjustment bushing is effectively applied across a partial area, whereby a resulting force component becomes effective in the desired actuating direction and the adjustment bushing is displaced. During normal operation, in contrast, the adjustment bushing is not displaced because in normal operation the working piston is not in the sealing position with the adjustment bushing, as a result of which the pressurized medium is applied to the adjustment bushing from both sides, causing it to be in an equilibrium of forces.

In a preferred embodiment, the adjustment section and the sealing section on the adjustment bushing are configured so that, as the working piston approaches, first the adjustment section comes in contact with the valve plunger and only thereafter does the sealing section assume the sealing position with the working piston. In this way, it is ensured that, during normal operation, the working piston does not even reach the sealing position with the sealing section of the adjustment bushing, because previously, with the approach of the adjustment bushing, the adjustment section has adjusted the valve plunger into the open position, whereupon the bypass channel is opened and pressure equalization between the pressure chambers is enabled. Since further steering assistance is eliminated, an adjustment in the direction of the axial limit stop would only be possible with significant manual effort. In contrast, if the wheels carry no load, further adjustment of the working piston, until the sealing position between the sealing section on the adjustment bushing and the working piston has been reached, can be carried out without difficulty.

This is advantageously achieved in that the sealing section on the adjustment bushing is axially recessed with respect to the adjustment section. At the same time, the sealing section may also be radially recessed, which is to say it may have a larger distance with respect to the inside wall of the servo cylinder than the adjustment section. The axial distance between the adjustment section and sealing section ensures that upon approach of the adjustment bushing, first the adjustment section comes in contact with the working piston, even before the sealing section comes in contact with the working piston. The radial recess of the sealing section with respect to the adjustment section also ensures that the pressurized medium effectively applies pressure to the adjustment bushing only from one side for performing the adjustment process, whereupon the adjustment bushing can be axially adjusted. In contrast, if the adjustment bushing and the working piston are not in the sealing position, the pressurized medium can engage the adjustment bushing from both sides, thereby causing the adjustment bushing to be in an equilibrium of forces.

The sealing section on the adjustment bushing and the corresponding section on the working piston are each advantageously configured as annular shoulders, which correspond to each other and can be brought into the sealing position. A sealing ring, which in particular is inserted into a groove on the annular shoulder of the working piston, can be provided in the region of the areas directly adjoining each other in the sealing position.

In order to allow the valve plunger to perform a movement relative to the working piston, the valve plunger is advantageously supported axially displaceably in a groove in the working piston. During normal operation, the valve plunger in the working piston is in a sealing position, in which the bypass channel is closed, and is moved, by the adjustment section of the adjustment bushing out of this sealing position, into an open position so that the bypass channel is opened. To this end, it may be advantageous to configure the valve plunger as two parts, wherein, in the sealing position, the valve plunger parts each rest against a sealing edge that delimits the bypass channel. The two valve plunger parts are preferably axially positioned by way of a spring element, which in particular is configured as a compression spring and presses the two valve plunger parts in opposite directions against a sealing edge configured at the working piston. Advantageously, the valve plunger delimits a radial gap, which is part of the bypass channel, wherein the width of the radial gap is determined by the current position of the valve plunger. Depending on the position of the valve plunger, the radial gap is wider or narrower, whereby an at least approximately viscosity-independent pressure reduction or pressure equalization between the pressure chambers can be implemented. This is achieved in particular in that a step that changes the cross-section is introduced into a wall delimiting the radial gap, wherein a pressure drop of the medium flowing into the bypass channel develops at this step. The pressure difference between the pressure upstream and downstream of the step that changes the cross-section acts axially on the valve plunger surface located in front of the step and subjects the same to a force counter to the spring element acting on the valve plunger parts. The step, and the surface at the valve plunger upstream of the step, can be set to suit the media, particularly hydraulic media having the lowest desired viscosity value.

Further advantages and advantageous embodiments are disclosed in the claims, the description of the figures, and the drawings.

DESCRIPTION OF THE PREFERRED EMBODIMENTS

Figure 1:
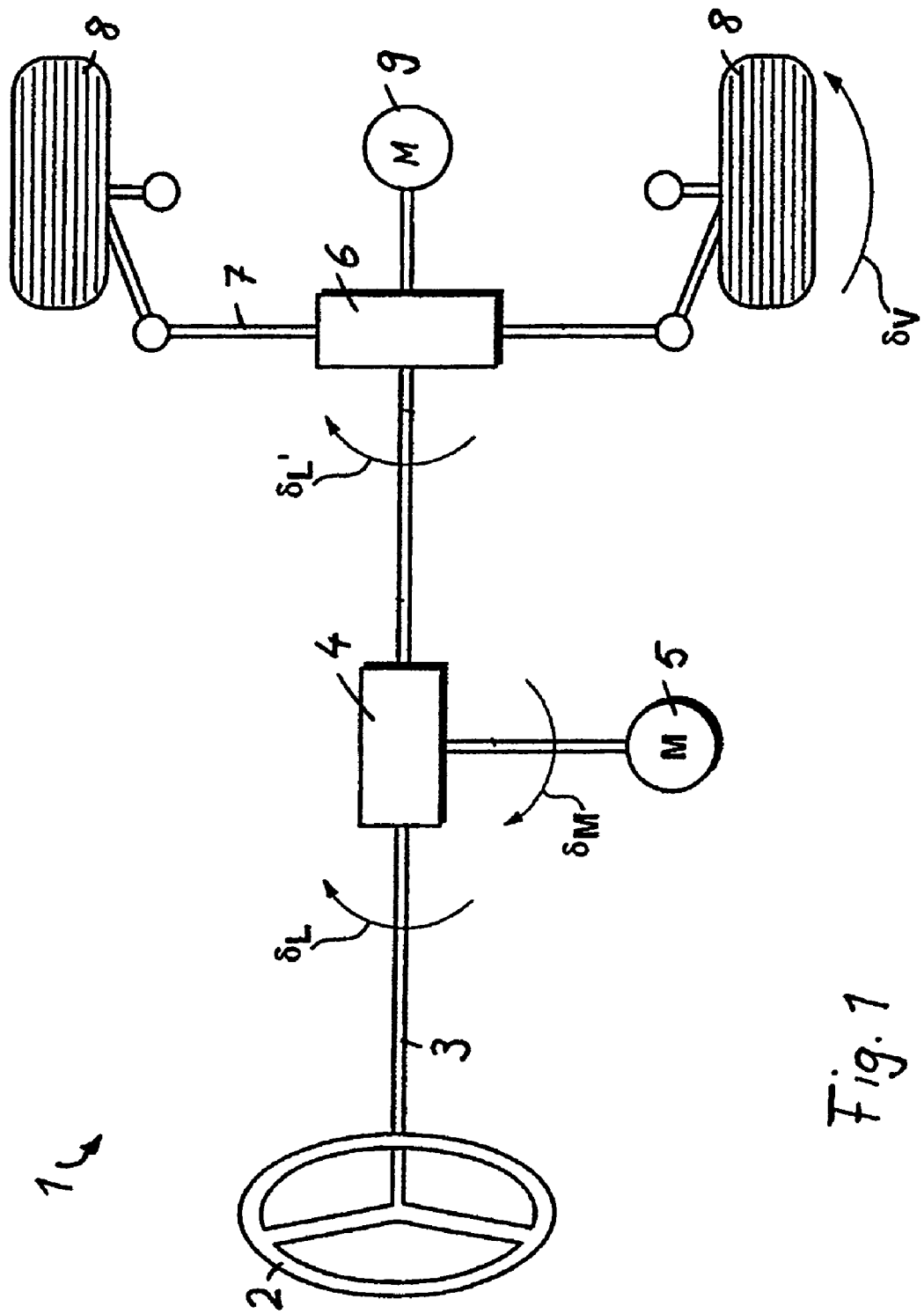
FIG. 1 is a schematic illustration of a steering system in a vehicle, comprising a servo motor acting on the steering gear and a superimposed transmission connected upstream of the steering gear.

In the figures, identical components are denoted by the identical reference numerals.

FIG. 1 illustrates a steering system for a motor vehicle, wherein a steering angle $\delta_L$ is set by the driver by way of the steering wheel 2, the angle being transmitted via the steering shaft 3 and a steering gear 6 to the steering linkage 7, which sets the steerable front wheels 8 to the desired wheel steering angle $\delta_v$. The steering shaft 3 is split into two parts, wherein a superimposed transmission 4 is interposed in the steering shaft 3, and with the help of this superimposed transmission an additional steering angle $\delta_M$ can be superimposed with the steering angle $\delta_L$ specified by the driver to produce a resulting steering angle $\delta_L'$. An actuator or servo motor 5 is disposed in the superimposed transmission 4, the desired additional steering angle $\delta_M$ being produced when this motor is actuated. If the servo motor 5 is not actuated, no additional steering angle $\delta_M$ is generated, so that the resulting steering angle $\delta_L'$ is identical to the steering angle $\delta_L$ specified by the driver.

Optionally, the superimposed transmission 4 can also be foregone.

Furthermore, a servo motor 9 is provided in the steering system 1 as a power steering device, the motor acting on the steering gear 6, via which the steering movement of the driver, is transmitted to the steering linkage 7, to support and reduce the steering torque to be applied by the driver. The power steering device is described in more detail below.

Figure 2:
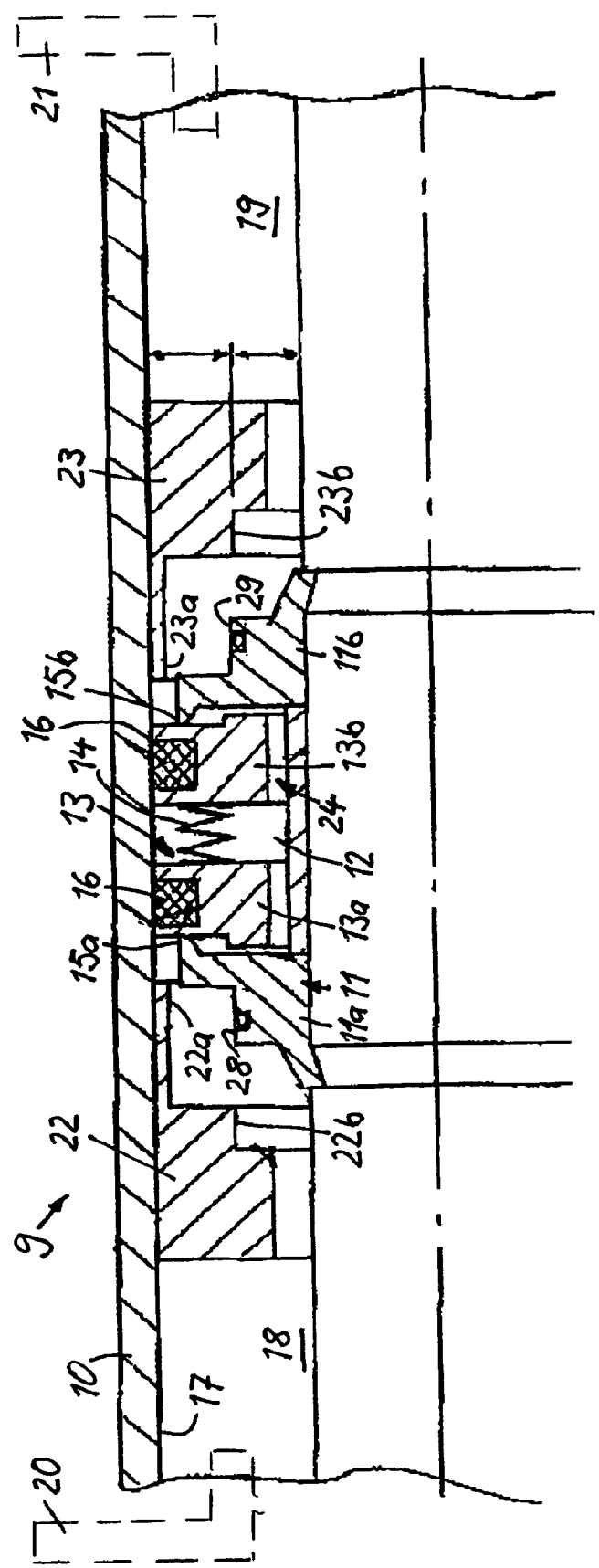
FIG. 2 is a sectional view of the servo cylinder of a power steering device.

The power steering device 9 is configured pneumatically or hydraulically and, as is apparent from FIG. 2, comprises a servo cylinder 10, in which a working piston 11 is guided in an axially displaceable manner. The working piston 11 carries a valve plunger 13, which can perform an axial movement relative to the working piston 11. For this purpose, the working piston 11 comprises a groove 12, which is axially delimited by the front sections 11a and 11b and in which the annular working piston 11 is accommodated and supported axially displaceably.

The valve plunger 13 is configured in two parts and comprises two individual valve plunger parts 13a and 13b, which are configured separate from each other, are each guided axially displaceably in the groove 12 of the working piston 11, and are coupled to each other by a spring element 14 configured as a compression spring. The spring element 14 pressurizes the two valve plunger parts 13a and 13b in opposite axial directions and pushes each valve plunger part 13a, 13b against a sealing edge 15a, 15b, which is configured at the front sections 11a, 11b. A radially outer sealing ring 16 is provided in each valve plunger part 13a, 13b to provide a sealing action with respect to the inside wall 17 of the servo cylinder 10.

The working piston 11 with the valve plungers 13 splits the inside space in the servo cylinder into two pressure chambers 18 and 19, which during normal operation are separated from each other in a flow-sealed manner and are connected to pressure supply units by way of inflows and outflows 20, 21. By way of these inflows and outflows 20 and 21, medium can flow under pressure into the respectively associated pressure chamber 18 or 19 or medium can be discharged from the respective pressure chamber by way of the inflows and outflows 20, 21. In each pressure chamber, an adjustment bushing 22, 23 is disposed, which constitutes the respective axial limit stop for the axial adjustment of the working piston 11. By introducing the pressurized medium into the associated pressure chamber 18 or 19 by way of the respective inflow 20, 21, the working piston 11 can be adjusted in the direction of the respectively opposite adjustment bushing 23, 22.

The adjustment bushings 22 and 23 are designed identical to each other, but are disposed mirrored from each other, each having an axially protruding adjustment section 22a, which extends in the direction of the working piston 11. The adjustment section 22a, 23a is located on the radial outside of each adjustment bushing 22, 23 and rests directly against the inside wall 17 of the servo cylinder 10. The purpose of the adjustment sections 22a, 23a is to pressurize the associated valve plunger part 13a or 13b against the respective axial limit stop as the working piston 11 approaches and to push it back axially counter to the force of the compression spring 14. In order to prevent a collision with the working piston 11, the respective front section 11a, 11b of the working piston has a radially tapered design and does not extend to the inside 17 of the servo cylinder 10, thereby clearing a passage for the adjustment section 22a or 23a. As the working piston 11 axially approaches the respective adjustment bushing 22, 23, the respective adjustment section 22a or 23a displaces the associated valve plunger part 13a or 13b counter to the force of the spring element 13 towards the back so that the sealing edge 15a or 15b of the respective valve plunger part is cleared.

Figure 3:
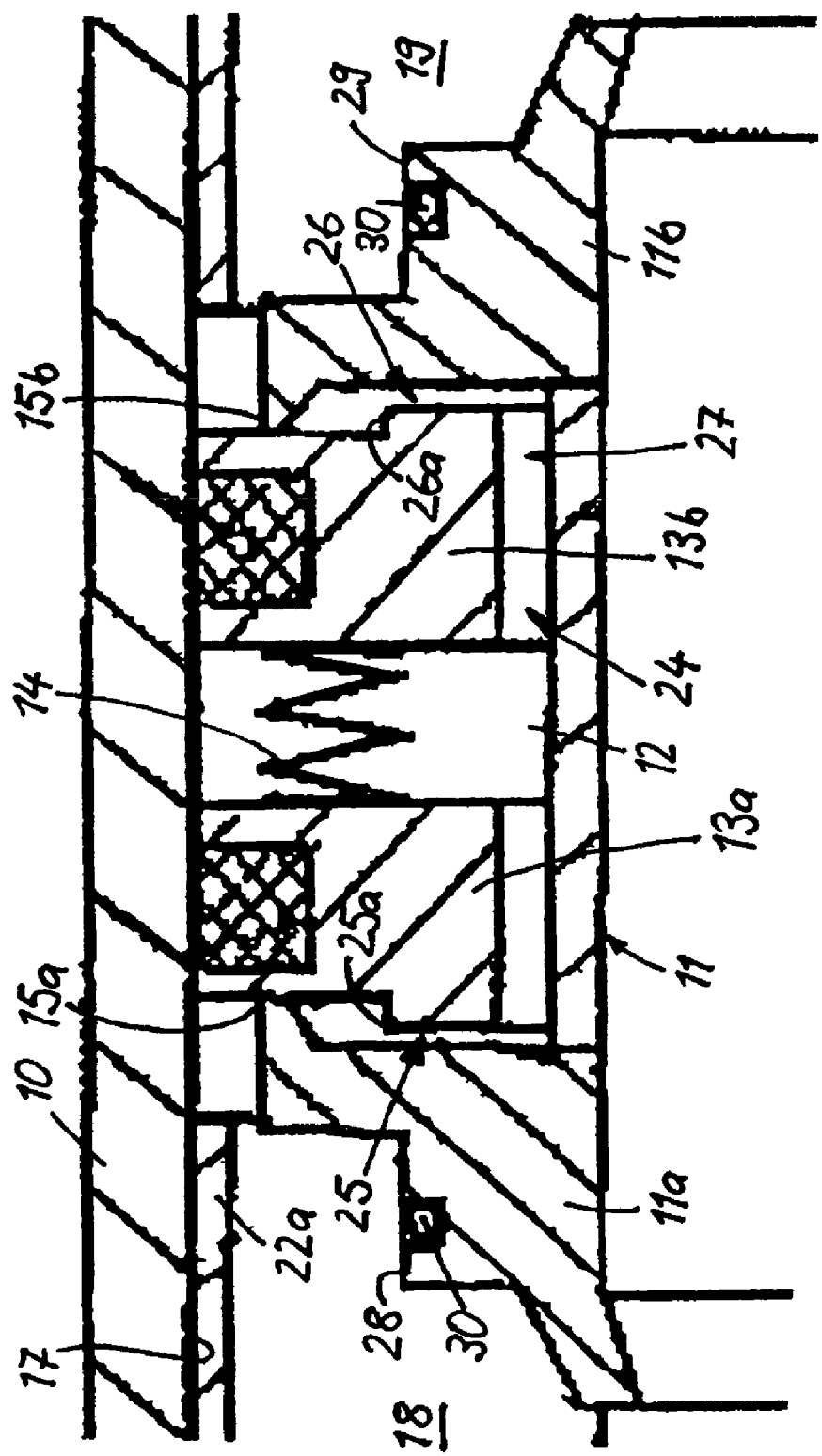
FIG. 3 is an enlarged cut-out from the region of the working piston guided in the servo cylinder and the valve plunger.

As is apparent from FIG. 2 and FIG. 3, a bypass channel 24 is configured between the working piston 11 and the valve plunger 13, the channel enabling direct flow transfer between the pressure chambers 18 and 19 so that pressure equalization between the pressure chambers can take place when the bypass channel is open. The bypass channel is composed of two radial gaps 25 and 26 and an axial gap 27 connecting the two radial gaps, wherein the radial gaps 25 and 26 each run in the radial direction and are delimited by mutually facing sides of the front section 11a or 11b and the valve plunger part 13a or 13b. The axial gap 27 extending in the axial direction between the two radial gaps 25 and 26 is delimited on the radial inside by the bottom of the groove 12 and on the radial outside by the radial insides of the valve plunger parts 13a and 13b.

If the working piston 11, with respect to the sectional illustration in FIGS. 2 and 3, is displaced to the left by pressurization of the right pressure chamber 19, the valve plunger part 13a runs against the adjustment section 22a of the adjustment bushing 22 and is thereby axially lifted off the sealing edge 15a out of the sealing position shown, counter to the force of the spring element 14. In this way, the bypass channel is cleared in this region. At the same time, the medium on the side of the pressure chamber 19 pushes the second valve plunger part 13b away from the sealing edge 15b, likewise counter to the force of the spring element 14, so that also on this side the bypass channel is cleared and direct flow transfer forming a bypass between the two pressure chambers 18 and 19 is cleared. Thereupon, medium can flow from the pressure chamber 19 via the bypass channel 24 into the pressure chamber 18, due to the pressure difference. Pressure equalization takes place analogously, when the working piston 11 is moved to the right by pressurization of the pressure chamber 18.

Each radial gap 25, 26 is provided with a cross-section reducing step 25a or 26a, which is formed on the delimiting wall side of the valve plunger parts 13a or 13b. Because of this, the radial gap 25 or 26 on the radially outer side adjoining the sealing edge 15a or 15b has a larger cross-section than on the radially inner side facing the axial gap 24. Due to this change in cross-section, when the bypass channel is open, a pressure drop occurs in the respective radial gap across the step 25a or 26a, which pressurizes the valve plunger part 13a or 13b radially above the step in accordance with the surface of the axial face of the valve plunger part, thereby producing a pressure force that adjusts the relevant valve plunger part counter to the force of the spring element 14. This pressure force is effective on the side of the valve plunger that faces away from the respective direction of movement of the working piston.

In addition to the adjustment section 22a or 23a, each adjustment bushing 22, 23 comprises a sealing section 22b or 23b, which is configured as an annular shoulder recessed radially and axially with respect to the adjustment section and which interacts with a corresponding annular shoulder 28 or 29 at the facing front section 11a or 11b of the working piston 11. The sealing section 22b or 23b is offset radially inward with respect to the adjustment section 22a or 23a and axially recessed with respect to the associated front section 11a or 11b of the working piston. The sealing section 22b or 23b can be moved into a sealing position with the associated annular shoulder 28 or 29 on the valve plunger part 13a or 13b, in which the mutually facing surfaces of the sealing section and annular shoulder rest against each other in a sealing manner. In order to improve the sealing effect, a sealing ring 30 (FIG. 3) is inserted into the annular shoulder 28 or 29. This sealing site is used to block the direct flow path between the pressure chambers 18 and 19 even when the bypass channel 24 is open. In this way, it is possible to bring the adjustment bushing 22 or 23, which is held with a clamping force, yet axially displaceably in the servo cylinder 10, into a desired axial position inside the servo cylinder, without requiring the use of tools or other complex measures.

This is achieved in that the vehicle is either lifted with the steered wheels, or the steerable wheels are placed on a rotary table, whereupon by actuating the steering wheel the working piston is brought to the axial limit stop of the particular adjustment bushing, the axial position of which is to be readjusted. Upon approaching the respective adjustment bushing, first the adjustment section comes in contact with the associated valve plunger part and pushes the same out of the sealing position at the associated sealing edge so that the bypass channel 24 is cleared and pressure equalization between the pressure chambers 18 and 19 can take place. However, since the steerable wheels carry no load, using relatively little manual effort the working piston can be adjusted further in the direction of the adjustment bushing until the sealing section 22b or 23b has reached a sealing position with the associated annular shoulder 28 or 29. Thereupon, the flow connection between the pressure chambers 18 and 19 is again interrupted.

In order to then adjust the respective adjustment bushing 22 or 23 towards the outside in the direction of a larger axial limit stop, it is only necessary to adjust the steering wheel against the axial limit stop while the wheels still carry no load, whereupon the working piston 11 axially displaces the respective adjustment bushing 22 or 23 to the outside against the clamping force thereof in the servo cylinder 10.

In order to achieve a displacement in the opposite direction, the steerable wheels are lowered or removed from the rotary table, after sealing contact between the sealing section 22b or 23b and the respective annular shoulder 28, 29 has been established, so that the usual counterholding force takes effect. As soon as steering takes place in the opposite direction, an accordingly higher pressure builds in the respective pressure chamber 18 or 19, which acts both on the adjustment bushing 22 or 23 and on the working piston 11. However, since the respective adjustment bushing 22, 23 is in sealing contact with the facing front section 11a or 11b of the working piston, the medium cannot spread in the respective pressure chamber on all sides of the adjustment bushing, but instead engages the adjustment bushing on the side facing away from the working piston and pressurizes this side with the high pressure of the introduced medium. Thereupon, the relevant adjustment bushing 22 or 23, together with the working piston 11, is adjusted back out of the remote axial end position.

In order to limit the readjustment process, it may be advantageous to provide a delimitation stop, against which the adjustment bushing runs. This delimitation stop is configured, for example, as a radially inwardly protruding extension on the inside 17 of the servo cylinder 10.

The invention claimed is:

1. A power steering device for a vehicle, which is disposed in a transmission path between a steering handle and a steerable vehicle wheel, comprising a servo cylinder having two pressure chambers which are separated by a working piston and are each connected to a pressure supply unit comprising a valve plunger which is movably disposed on the working piston and seals a bypass channel between the pressure chambers, at least one adjustment bushing being disposed in the servo cylinder, the bushing comprising an adjustment section against which the valve plunger is moved upon approaching an axial end position, whereby the valve plunger is pressurized into a position that opens the bypass channel, said adjustment bushing being clamped into the servo cylinder displaceably, and the adjustment bushing comprises a sealing section, wherein the working piston is to be brought into a sealing position with the sealing section and in the sealing position the flow connection between the pressure chambers is interrupted.

2. The power steering device according to claim 1, wherein the adjustment section and the sealing section on the adjustment bushing are configured so that, as the working piston approaches, first the adjustment section comes into contact with the valve plunger and subsequently the sealing section reaches the sealing position with the working piston.

3. The power steering device according to claim 1, wherein the sealing section on the adjustment bushing is axially recessed with respect to the adjustment section.

4. A power steering device according to claim 1, wherein the sealing section on the adjustment bushing is positioned radially at a distance from an inside wall of the servo cylinder.

5. A power steering device according to claim 1, wherein the sealing section is configured on an annular shoulder of the adjustment bushing.

6. A power steering device according to claim 1, wherein an annular shoulder, which corresponds to the sealing section on the adjustment bushing and which is to be brought into the sealing position, is configured on the working piston.

7. A power steering device according to claim 1, wherein the valve plunger is supported axially displaceably in a groove in the working piston.

8. A power steering device according to claim 1, wherein the valve plunger is split into two parts, wherein in the sealing position the valve plunger parts each rest against a sealing edge delimiting the bypass channel.

9. The power steering device according to claim 8, wherein the two valve plunger parts are held positioned by a spring element.

10. A power steering device according to claim 1, wherein the valve plunger delimits a radial gap of the bypass channel, and wherein the width of the radial gap is determined by the current position of the valve plunger.

11. The power steering device according to claim 10, comprising a means having an axial gap having a constant cross-section, the gap being connected to the radial gap.

12. The power steering device according to claim 10, comprising a step that changes the cross-section and which is introduced into a wall delimiting the radial gap.

13. The power steering device according to claim 12, wherein the step is introduced into a wall of the valve plunger that delimits the radial gap.

14. The power steering device according to claim 12, wherein the step in the radial gap is adapted to a minimum-viscosity working medium in the servo cylinder so that a pressure drop develops at the step, the drop displacing the valve plunger axially counter to the force of the spring element acting thereon.

15. A method for the axial adjustment of an adjustment bushing in a power steering device according to claim 1, wherein a load is removed from the steerable wheels and in the unloaded state the working piston is adjusted by way of a steering angle in the direction of the axle stop so far until the working piston is in the sealing position with the sealing section of the adjustment bushing.

16. The method according to claim 15, wherein the displacement of the adjustment bushing takes place in the direction of an axially further removed axle stop while the steerable wheels are unloaded.

17. The method according to claim 15, wherein the displacement of the adjustment bushing in the opposite direction takes place under load.

* * * * *